United States Patent [19]

Hesse et al.

[11] Patent Number: 5,426,152
[45] Date of Patent: Jun. 20, 1995

[54] RUBBER MIXTURES AND VULCANIZED COMPOUNDS PREPARED THEREFROM HAVING IMPROVED ADHESION TO REINFORCING SUPPORTS

[75] Inventors: Wolfgang Hesse, Taunusstein; Erhard Leicht, Holheim; Richard Sattelmeyer, Wiesbaden, all of Germany

[73] Assignee: Hoechst AG, Germany

[21] Appl. No.: 324,769

[22] Filed: Oct. 17, 1994

Related U.S. Application Data

[63] Continuation of Ser. No. 134,286, Oct. 8, 1993, abandoned, which is a continuation of Ser. No. 891,395, May 29, 1992, abandoned, which is a continuation-in-part of Ser. No. 641,659, Jan. 15, 1991, abandoned.

[30] Foreign Application Priority Data

Jul. 20, 1990 [DE] Germany .................... 30 01 606.4

[51] Int. Cl.$^6$ ............... C08L 61/06; C08L 61/14; C08L 7/02
[52] U.S. Cl. ................ 525/139; 525/133.5; 525/134; 525/149; 428/460
[58] Field of Search ........ 525/139, 133.5, 134, 525/149; 428/460

[56] References Cited

U.S. PATENT DOCUMENTS

| | | | |
|---|---|---|---|
| 3,625,874 | 12/1971 | Cottman | 260/5 |
| 3,644,537 | 2/1972 | Dannels et al. | 260/619 B |
| 3,808,018 | 4/1974 | Plueddemann | 106/218 |
| 3,955,036 | 5/1976 | Plueddemann | 428/429 |
| 3,981,851 | 9/1976 | Plueddemann | 526/267 |
| 4,719,255 | 1/1988 | Yoshizumi et al. | 523/436 |
| 5,314,986 | 5/1994 | Ooms et al. | 528/219 |

Primary Examiner—W. Robinson Clark
Attorney, Agent, or Firm—Bierman and Muserlian

[57] ABSTRACT

Preparation of vulcanizable rubber mixtures and vulcanized compounds thereof having improved adhesion to reinforcing supports based on steel cord and textile fibers, in which effective amounts of modified novolaks are added to the rubber mixtures as adhesion promotors, which are prepared by simultaneous reaction of polyhydric phenols with aldehydes and unsaturated hydrocarbons with acid catalysis at elevated temperature and do not contain any troublesome proportions of free starting phenols. Rubber mixtures according to the invention can be processed in an easy advantageous manner without liberating toxic substances which might be detrimental to persons working in processing and/or to the environment. Rubber mixtures according to the invention which can be prepared, processed and vulcanized by known methods by thorough mixing of the components are highly suitable for the manufacture of industrial rubber articles containing reinforcing supports based on steel cord and textile fibers such as, for example, tubings, fan belts, conveyor belts and tires, the resulting vulcanized compounds having excellent adhesion properties to the reinforcing supports mentioned in combination with a surprisingly good constancy of properties upon exposure to moisture.

11 Claims, No Drawings

RUBBER MIXTURES AND VULCANIZED COMPOUNDS PREPARED THEREFROM HAVING IMPROVED ADHESION TO REINFORCING SUPPORTS

PRIOR APPLICATION

This is a continuation of U.S. patent application Ser. No. 134,286 filed Oct. 8, 1993, which is a continuation of U.S. patent application Ser. No. 891,395 filed May 29, 1992, both now abandoned which is a continuation-in-part of U.S. patent application Ser. No. 641,659 filed Jan. 15, 1991, now abandoned.

The invention relates to rubber mixtures which are vulcanizable and have improved adhesion to reinforcing supports based on steel cord and textile fibers. The rubber mixtures contain modified novolaks as adhesion promotors, which are obtainable by simultaneous reaction of polyhydric phenols with aldehydes and unsaturated hydrocarbons with acid catalysis at elevated temperatures by known methods and do not contain any troublesome proportions of free starting phenols. The novolaks thus modified have the further advantage of preventing the exposure of environment and workers to toxic levels when they are used in the preparation and processing of rubber mixtures, which is the case, as is known, when comparable rubber mixtures containing or releasing free resorcinol are prepared and processed, due to the toxic material liberated.

When industrial rubber articles are manufactured, the use of resorcinol for achieving good adhesion of the rubber to reinforcing supports, such as, for example, textile fiber fabrics or steel cord, is part of the prior art, as described, inter alia, in a number of patents, for example U.S. Pat. No. 4,148,769, DE-AS 2,002,023, and DE-AS 2,414,789. According to the prior art, resorcinol or precondensation products prepared therefrom can be used as adhesion promotors having specific activity, in order to achieve the desired good adhesion properties. The resorcinol precondensation products used are products such as can be obtained, for example, by the condensation reaction of formaldehyde or compounds releasing formaldehyde with resorcinol or mixtures of resorcinol and a further phenol. Since the preparation of the precondensation products, as is known, takes place in the presence of a substantial stoichiometric excess of resorcinol or resorcinol+phenol, relative to the formaldehyde, the products thus finished contain a substantial proportion of free phenolic starting components which, in particular in the case of resorcinol, can be up to 20% by weight, relative to the precondensation product prepared.

However, with respect to rubber manufacture, the hitherto known prior art in general has the serious disadvantage that the incorporation of resorcinol or its precondensation products in the rubber mixture leads to extensive smoking and fuming, since the mixing is carried out at relatively high temperatures and in particular the free resorcinol escapes into the atmosphere to a large extent. However, due to the toxic properties of resorcinol, this is highly undesirable. This serious disadvantage also occurs when precondensation products of resorcinol are used. Moreover, resorcinol and its mixed condensation products with phenol have only low affinities for the customary unpolar rubber types, due to their pronounced polar structure.

Accordingly, the object of the present invention was to overcome the disadvantages mentioned when resorcinol or its precondensation products are used and to provide a product which can be used during rubber manufacture in rubber mixtures without difficulties and without losing the advantageous effect of resorcinol and without polluting the environment or representing a health risk to persons involved in the rubber manufacture.

Surprisingly, it has now been found that the above-mentioned disadvantages can be overcome by replacing the resorcinol or its precondensation products with aldehydes in the rubber mixtures with modified novolaks, which are prepared by simultaneous reaction of polyhydric phenols with aldehydes and unsaturated hydrocarbons in the presence of acid catalysts at elevated temperature and do not contain any troublesome proportions of free starting phenols.

By virtue of the invention, the abovementioned disadvantages can be avoided and the pollution of the environment and the exposure of the workers handling these substances to toxicologically unsafe materials can be substantially reduced. The rubber mixtures prepared according to the invention can be processed more easily and advantageously, compared with the corresponding mixtures having known adhesion promotors based on resorcinol, and, due to the less polar structure of the modified novolaks used, they also lead to increased adhesion of the rubber mixtures to the reinforcing supports. The observation that the adhesion is improved according to the invention and, after intensive exposure of the vulcanized rubber mixtures to moisture, shows a smaller decline at higher temperatures than the hitherto known comparable vulcanized systems is also of significant importance.

Accordingly, the invention relates to rubber mixtures which are vulcanizable and have improved adhesion to reinforcing supports based on steel cord or textile fiber and contain vulcanizable rubber, adhesion promotors, vulcanizing agent, curing agents, fillers and customary additives, and to the vulcanized compounds of these rubber mixtures, which contain modified novolaks as adhesion promotors, which are prepared by simultaneous reaction of polyhydric phenols with aldehydes and unsaturated hydrocarbons in the presence of an acid catalyst at elevated temperature and do not contain any troublesome proportions of free starting phenols.

The modified novolaks used according to the invention can be prepared by known methods, as described, for example, in German Patent No. 2,254,379.

The phenol components which can be used for preparing the modified novolak resins used according to the invention are polyhyric mono- or multinuclear phenols, preferably those carrying one or more hydroxyl groups on the same aromatic ring, such as, for example, pyrogallol, hydroquinone, catechol, resorcinol, preferably resorcinol. Suitable polyhydric and polynuclear phenols are also condensation products of monohydric phenols and oxo compounds. These can be added as such or prepared in situ during the reaction.

The aldehydes which can be used are alkanals or arylalkanals, preferbly ($C_1$–$C_{10}$)-alkanals or ($C_7$–$C_{10}$)-arylalkanals, such as, for example, formaldehyde in aqueous solution or in the form of paraformaldehyde or trioxane, acetaldehyde, also in the form of substances releasing acetaldehyde, higher aldehydes, such as, for example, butyraldehyde, hexanal, octanal, nonanal. Formaldehyde and compounds releasing formaldehyde are particularly preferred.

The unsaturated hydrocarbons which can be used are natural or synthetic compounds having one or more carbon-carbon double bonds, in the latter case also those having conjugated double bonds. The natural unsaturated compounds which can be used are unsaturated fatty acids, fatty oils derived therefrom, fatty amides or fatty alcohols.

Suitable starting compounds are furthermore unsaturated natural products based on terpene, for example turpentine oil, rosin. The synthetic unsaturated hydrocarbon compounds which can be used are alkenes, dienes or even higher unsaturated hydrocarbons, such as, for example, butene, isobutene, isooctene, isononene, isododecene, or di-unsaturated compounds, such as, for example, butadiene, isoprene, chloroprene, dichlorobutadiene, dicyclopentadiene. Acetylenically unsaturated compounds, such as, for example, acetylene or ($C_1$–$C_{10}$)- alkyl- or di($D_1$–$C_{10}$)-alkylacetylenes are also suitable. Examples of suitable compounds are preferably vinylaromatics, in particular vinyltoluene, and particular preferably styrene.

Examples of suitable rubber types which are vulcanizable with sulfur are preferably natural rubber, polyisoprene, polybutadiene, styrene/butadiene rubber, acrylonitrile rubber, butyl rubber, ethylene/propylene/diene terpolymer rubber or mixtures thereof, such as conventionally used in the tire industry or for the manufacture of industrial rubber goods. The further customary components can be, for example, fillers, such as carbon blacks, silicas, chalk, kaolins and pigments of inorganic or organic nature, such as titanium dioxide, iron oxide and phthalacyanine dyes. Further customary components are, for example, vulcanizing agents from the group comprising sulfur and sulfur-donating compounds and vulcanizing aids, such as, for example, accelerators and activators. The use oil additives, for example from the group comprising stearic acid, zinc oxide, anti-ageing agents, tackiness-increasing resins, as well as metal compunds for the additional improvement of rubber adhesion to steel cord, for example salts of cobalt or nickel of single-chain carboxylic acids, preferably naphthenic acids or isooctanoic acid, is also customary. Furthermore, additions of mineral oils and plasticizers, such as, for example, phthalic esters is also customary for improving processing.

The modified novolak resins used according to the invention can be cured by adding conventional curing agents, such as, for example, hexamethylenetetramine or methylene donors in the form of melamine resins of suitable composition. For this purpose, the melamine resins can be used in pure form as crystalline or liquid products or, preferably, as flowable products after previous adsorption on suitable solid support materials, which can be processed in an advantageous manner.

The vulcanizable rubber mixtures according to the invention can be prepared in the usual manner, for example in internal mixers or on mixing rolls. For the purpose of improved distribution of the adhesion promotors according to the invention, it may be advantageous to increase the mixing temperature during any desired mixing phase to a value above the melting range of the added adhesion promotors resin. Furthermore, it is important that the curing agents are, if possible, only incorporated at the end of the mixing process at moderately high temperatures (in general at 80° to 100° C.) so as to avoid a premature reaction with the cross-linkable resin components.

As for the rest, the selection of components and determination of their relative amounts in percent in the vulcanizable rubber mixtures can be carried out by known criteria. The mixing of the components at elevated temperatures can also be carried out in a known manner, for example at 100° to 160° C., inter alia, for example in conventional heatable internal mixers or on conventional heatable mixing rolls. Likewise, the vulcanization of the vulcanizable rubber mixtures according to the invention can be carried out in a known manner at standard temperatures in conventional heatable apparatuses, if desired under pressure.

The proportion of the adhesion promotors according to the invention in the vulcanizable rubber mixtures is not critical and can be preferably up to 20% by weight, in particular up to 15% by weight, particularly preferably 0.5 to 10% by weight, relative to the vulcanizable rubber mixture. The additional use of other known adhesion promotors is in general also possible, as long as they do not cause or have any disadvantageous or detrimental effects.

The composition of the modified novolaks used according to the invention as adhesion promotors can be varied in a wide range. The molar ratio of the components polyhydric phenols unsaturated hydrocarbons aldehydes is preferably 1:0.1:0.3 to 1:1.5:0.95, in particular 1:0.4:0.5 to 1:1.1 to 0.8. Particularly preferred components are resorcinol, formaldehyde and styrene. To further characterize the modified novolak resins usable according to the invention as adhesion promotors, for example, the melting point, the viscosity of their solutions in a suitable organic solvent and the hydroxyl number of the resin can additionally be used, these values being in the usual range for novolaks. Preferably, those resins are used which are present under standard conditions in solid small-particle form. Their melting point should at least be high enough to prevent the products from agglomerating upon storage at room temperature and during transport.

The vulcanizable rubber mixtures according to the invention which can be prepared, processed and vulcanized by known methods are highly suitable for the manufacture of industrial rubber articles, preferably of those containing reinforcing supports based on steel cord or textile fiber. They can be used in particular for the manufacture of tubings, fan belts, conveyor belts and tires, since they have not only excellent adhesion properties to the reinforcing supports mentioned but also a surprisingly good consistency of properties upon exposure to moisture.

The invention is illustrated in more detail by the examples which follow. pbw denotes parts by weight and % denotes percent by weight, unless stated otherwise.

EXAMPLE 1

Preparation of a modified novolak 770 pbw of resorcinol, 140 pbw of toluene and 0.75 pbw of concentrated sulfuric acid were heated at reflux in a reaction vessel equipped with stirrer, thermometer and reflux condenser with water separator. After reaching 140° C., 454 pbw of a 37% strength by weight of aqueous formaldehyde solution and 364 pbw of styrene were added dropwise separately to the mixture from two separate metering devices over a period of three hours with stirring at such a rate that the amounts of styrene and aqueous formaldehyde run in per time unit were proportional to the respective total amount. During the addition, the temperature of the mixture increased to 150° C. After heating at reflux for 3.5 hours, 382 pbw of an aqueous phase containing 0.37% of formaldehyde and 0.15% of resorcinol had been deposited in the water separator. 0.96 pbw of magnesium oxide was then added to the batch, and the solvent was distilled off at 200° C. under a pressure which had been reduced to 100 mbar. The distillation residue was then cooled to obtain 1170 pbw of a red-brown resin having a melting point of 130° C. The free resorcinol content of the resin was <1% by weight and the viscosity of a 50% strength by weight solution of the resin in methoxypropanol was 5300 mPa.s at 20° C.

EXAMPLE 2

Example 1 was repeated, except that 340 pbw of 37% strength by weight of aqueous formaldehyde solution were used instead of 454 pbw and 582 pbw of styrene were used instead of 364 pbw. This gave 1387 pbW of a red-brown resin having a melting point of 80° C. The free resorcinol content of the resin was <1% by weight and the viscosity of a 50% strength by weight solution of the resin in methoxypropanol was 552 mPa.s at 20° C.

EXAMPLE 3

The modified novolaks of Examples 1 and 2 were each tested for their effects in vulcanizable rubber mixtures. For this purpose, a rubber base mixture A was first prepared at about 150° C. by thorough mixing of the starting components. Of this rubber base mixture A, suitable amounts were removed in each case and mixed in a further mixing step B at temperatures above 100° C. with the adhesion promotor to be tested. Then, in a third mixing Step C, the sulfur, the accelerator and the curing agent were mixed in at temperatures below 100° C. according to the following compositions:

Rubber based mixture A comprising:
  100 pbw of natural rubber
  40 pbw of carbon black
  15 active silica
  5 pbw of zinc oxide
  1 pbw of stearic acid
  1 pbw of anti-ageing agent Mixing Step B:
  162 pbw of rubber base mixture A were initially introduced in each case and at a temperature of 130° C.
  2.5 pbw of adhesion promotor resin from Example 1 (=Example 3) or from Example 2 (=Example 4) or customary resorcinol (=Comparative Example 1 not according to the invention) were mixed in.

Mixing Step C:
  164.5 pbw of mixing step B were initially introduced in each case and at a temperature of 90° C.
  4.0 pbw of sulfur
  0.8 pbw of 2-(4-morpholinylthio)-benzothiazole and
  3.85 pbw of melamine resin powder/65% strength on support material were mixed in.

The behavior of the respective mixture upon mixing in the respective adhesion promotor in the mixing Step B and during the subsequent mixing in mixing Step C and also in the subsequent vulcianization of the respective vulcanizable mixture obtained from mixing Step C at 145° C. over a period of 60 minutes in a test specimen is described in Table 1.

The following characteristic properties were tested by known methods on the vulcanized compounds of Examples 3 and 4 and Comparative Example 1 resulting from the vulcanization as test specimens:

a) tear strength and elongation at break according to DIN 53504
b) breaking force and degree of coverage in the steel cord adhesion test.

The results are listed in Table 1 in summarized form.

Of particular importance are the results of the steel cord adhesion test, in which, according to a known method, steel cord of dimensions 4×0.25 mm having a copper content of the brass plating of about 67% is embedded in special molds in the vulcanized rubber mixture, were then vulcanized. The vulcanized specimens were then stored at 23° C. and 50% relative humidity (r.h.) and at 90° C. and 100% relative humidity (r.h.). The force necessary to tear out the steel cord filaments from the vulcanized rubber mixture was then measured and the degree of coverage of the steel cord was evaluated. This is understood to mean the wire area of the pulled-out cord covered with rubber, which was estimated in steps of 10% and rated by numerical values from 1 to 10. Consequently, the numerical ratings 1, 2, 3 ... 10 denote 10, 20, 30 ... 100% of covered wire area. The results given in Table 1 are the average measured values of ten individual tests in each case.

As can be seen from the measurement values in Table 1, using the vulcanized rubber mixtures of Examples 3 and 4, higher tear-out forces and degrees of coverage were obtained than in the comparative system using resorcinol from Comparative Example 1. Moreover, in Examples 3 and 4 of the invention virtually no irritations of the workers due to smoke formation or odor during processing and also virtually no pollution of the environment due to toxic material, compared with Comparative Example 1 in which resorcinol was used, take place. This is clearly evident from the test results listed in Table 1 below.

TABLE 1

| | Tests carried out | | |
|---|---|---|---|
| | | | Comparative |
| | Example 3 | Example 4 | Example 1 |
| | Vulcanized rubber mixture containing adhesion promotor resin from | | |
| | Example 1 | Example 2 | Resorcinol |
| | | Test results | |
| Preparations of mixtures B and C and vulcanization: | | | |
| Smoke formation | none | none | very strong |
| Odor | rubber odor | rubber odor | strong resorcinol odor |
| Vulcanized compound: | | | |
| Tear strength (Mpa) | 23.0 | 20.8 | 13.4 |
| Elongation at break (%) (= % of longitudinal elongation, relative to the length of the starting test specimen) | 349 | 374 | 329 |
| Steel cord ahesion: Force/degree of coverage [(N/cm)/ numerical rating] after | | | |
| 3 days of storage at 23° C. and 50% r.h. | 346/9 | 362/9 | 252/9 |
| 7 days of storage at 90° C. and 100% r.h. | 155/3 | 170/3 | 141/1 |

EXAMPLE 5

Preparation of a modified novolak 770 pbw of resorcinol, 140 pbw of xylene and 0.75 pbw of concentrated sulfuric acid were heated at reflux in a reaction vessel equipped with stirrer, thermometer and reflux condenser with water separator. After reaching 140° C., 397 pbw of a 37% strength by weight of aqueous formaldehyde solution and 952 pbw of α-pinene were added dropwise separately to the mixture from two separate metering device over a period of three hours with stirring at such a rate that the amounts of α-pinene and aqueous formaldehyde run in per time unit were proportional to the respective total amount. During the addition, the temperature of the mixture increased to 150° C. After heating at reflux for 3.5 hours, 338 pbw of an aqueous phase containing 0.37% of formaldehyde and 0.15% of resorcinol had been deposited in the water separator. 0.96 pbw of magnesium oxide was then added to the batch, and the solvent was distilled off at 200° C. under a pressure which had been reduced to 100 mbar. The distillation residue was then cooled to obtain 1677 pbw of a red-brown resin having a melting point of 160° C. The free resorcinol content of the resin was 0.37% by weight and the viscosity of a 50% strength by weight solution of the resin in methoxy propanol was 771 mPa.s at 23° C.

EXAMPLE 6

The modified novolak of Example 5 was tested for its effect in a vulcanizable rubber mixture. For this purpose, a rubber base mixture was first prepared at about 150° C. by thorough mixing of the starting components. Of this rubber base mixture D, suitable amounts were removed in each case and mixed in a further mixing step E at temperatures above 100° C. with the adhesion promotor to be tested. Then, in a third mixing step F, the sulfur, the accelerator and the curing agent were mixed in at temperature below 100° C. according to the following compositions:

Rubber based mixture D comprising:
  100 pbw of natural rubber
  50 pbw of carbon black
  5 pbw of active silica
  5 pbw of zinc oxide
  1 pbw of stearic acid
  1 pbw of anti-ageing agent
Mixing Step E:
  162 pbw of rubber base mixture D were initially introduced in each case and at a temperature of 130° C.
  2.5 pbw of adhesion promotor resin from Example 5 or customary resorcinol (=Comparative Example 2 not according to the invention) were mixed in.
Mixing Step F:
  164.5 pbw of mixing Step E were initially introduced in each case and at a temperature of 90° C.
  5.0 pbw of sulfur
  1.2 pbw of benzothiazole-2-cyclohexylsulfenamide and
  3.85 pbw of melamine resin powder/65% strength on support material were mixed in.

The behavior of the respective mixture upon mixing in the respective adhesion promotor in the mixing Step E and during the subsequent mixing in mixing Step F and also in the subsequent vulcanization of the respective vulcanizable mixture obtained from mixing Step F at 145° C. over a period of 60 minutes in a test specimen is described in Table 2. The test results are listed in Table 2 in summarized form.

TABLE 2

| | Tests carried out | |
|---|---|---|
| | | Comparative |
| | Example 6 | Example 2 |
| | Vulcanized rubber mixture containing adhesion promotor resin from | |
| | Example 5 | Resorcinol |
| | Test results | |
| Preparations of mixtures E and F and vulcanization: | | |
| Smoke formation | nons | very strong |
| Odor | rubber odor | strong resorcinol odor |
| Vulcanized compound: | | |
| Tear strength (MPa) | 22.9 | 17.2 |
| Elongation at break (%) (= % of longitudinal elongation, relative to the length of the starting test specimen) | 333 | 280 |
| Steel cord adhesions: Force/degree of coverage [(N/cm)/ numerical rating] after | | |
| 3 days of storage at 90° C. and 100% r.h. | 251/7 | 242/7 |

Various modifications of the compositions and method of the invention may be made without departing from the spirit or scope thereof and it is to be understood that the invention is intended to be limited only as defined in the appended claims.

What is claimed is:

1. A rubber mixture which is vulcanizable and has improved adhesion to reinforcing supports based on steel cord or textile fibers and comprising vulcanizable rubber, curing agents, fillers and modified novolak as adhesion promotor, the latter is prepared by simultaneous reaction of mononuclear polyhydric phenols with aldehydes and unsaturated compounds selected from the group consisting of
   (1) terpene natural products;
   (2) natural compounds selected from the group consisting of fatty acids, fatty oils derived therefrom, fatty amides and fatty alcohols;
   (3) synthetic hydrocarbon compounds selected from the group consisting of alkenes, dienes, acetylene, ($C_1$-$C_{10}$)-alkylacetylenes and di-($C_1$-$C_{10}$)-alkylacetylenes;
in the presence of an acid catalyst at elevated temperatures and does not contain any residual starting phenols.

2. A rubber mixture of claim 1 wherein the adhesion promotor was prepared from resorcinol, the aldehyde of 1 to 10 carbon atoms and an unsaturated compound.

3. A rubber mixture of claim 1 wherein the adhesion promotor was prepared from resorcinol, formaldehyde or a compound releasing formaldehyde and the unsaturated compound.

4. A rubber mixture of claim 1 wherein the molar ratio of mononuclear polyhydric phenols:unsaturated compounds:aldehydes during the preparation of the adhesion promotor is 1:0.1:0.3 to 1:1.5:0.95.

5. A rubber mixture of claim 1 wherein the molar ratio of polyhydric phenols:unsaturated compounds:aldehydes during the preparation of the adhesion promotors is: 1:0.4:0.5 to 1:1.1 0.8.

6. A rubber mixture of claim 1 which contains up to 20% by weight of adhesion promotor, relative to the vulcanizable rubber mixture.

7. A method of preparing an industrial rubber article containing reinforcing supports based on steel cord or textile fibers comprising vulcanizing a rubber mixture of claim 1 to said reinforcing supports.

8. The method of claim 7 wherein the industrial rubber article is selected from the group consisting of tubings, fan belts, conveyor belts and tires.

9. An industrial rubber article containing reinforcing supports based on steel cord or textile fibers by vulcanizing a rubber mixture of claim 1 to said reinforcing supports.

10. A vulcanized product of the rubber mixture of claim 1.

11. A rubber mixture which is vulcanizable and has improved adhesion to reinforcing supports based on steel cord or textile fibers and comprising vulcanizable rubber, curing agents, fillers and modified novolak as adhesion promotor, the latter is prepared by simultaneous reaction of mononuclear polyhydric phenols with aldehydes and unsaturated compounds selected from the group consisting of fatty acids, fatty oils derived therefrom, fatty amides, fatty alcohols, turpentine oil, rosin, α-pinene, butene, isobutene, isooctene, isononene, isododecene, butadiene, isoprene, chloroprene, dichlorobutadiene, dicyclopentadiene and acetylene in the presence of an acid catalyst at elevated temperatures and does not contain any residual free starting phenols.

* * * * *